(12) United States Patent
Robinson, Jr.

(10) Patent No.: US 8,259,712 B2
(45) Date of Patent: Sep. 4, 2012

(54) METHODS AND APPARATUS FOR INTERCONNECTION OF MEDIA GATEWAYS

(75) Inventor: Lewis E. Robinson, Jr., Dallas, TX (US)

(73) Assignee: Genband US LLC, Plano, TX (US)

( * ) Notice: Subject to any disclaimer, the term of this patent is extended or adjusted under 35 U.S.C. 154(b) by 739 days.

(21) Appl. No.: 11/132,893

(22) Filed: May 19, 2005

(65) Prior Publication Data

US 2006/0262780 A1      Nov. 23, 2006

(51) Int. Cl.
*H04L 12/50* (2006.01)
*H04L 12/28* (2006.01)

(52) U.S. Cl. ........ 370/359; 370/369; 370/376; 370/386; 370/400

(58) Field of Classification Search .................. 370/367
See application file for complete search history.

(56) References Cited

U.S. PATENT DOCUMENTS

| | | | | |
|---|---|---|---|---|
| 4,975,946 A * | 12/1990 | Bovo et al. | .................... | 379/269 |
| 5,590,129 A * | 12/1996 | Ardon | ........................... | 370/376 |
| 7,706,802 B2 * | 4/2010 | Xu et al. | ....................... | 455/445 |
| 2001/0053160 A1 * | 12/2001 | Dally | ............................ | 370/535 |
| 2003/0103614 A1 * | 6/2003 | Smith | ........................... | 379/244 |
| 2003/0105799 A1 * | 6/2003 | Khan et al. | ..................... | 709/201 |
| 2004/0151163 A1 * | 8/2004 | Jang | .............................. | 370/352 |
| 2004/0213205 A1 * | 10/2004 | Li et al. | .......................... | 370/352 |
| 2004/0257982 A1 * | 12/2004 | Boll et al. | ...................... | 370/217 |
| 2005/0207338 A1 * | 9/2005 | Chen | ............................ | 370/221 |
| 2006/0031340 A1 * | 2/2006 | Mathew et al. | ............... | 709/206 |

OTHER PUBLICATIONS

Agere Systems, *STSI-144 Scalable Time-Slot Interchanger Product Description*, Product Description, May 2002, 10 pgs., Copyright 2004.
Agere Systems, *STSI-144 Scalable Time-Slot Interchanger System Design Guide*, System Design Guide, May 2004, 38 pgs., Copyright 2003.

* cited by examiner

*Primary Examiner* — John Blanton
(74) *Attorney, Agent, or Firm* — Jenkins, Wilson, Taylor & Hunt, P.A.

(57) ABSTRACT

An apparatus that includes W interfaces to a circuit-switched network, where W is an integer number that equals the product of smaller integer numbers X and N. The apparatus also includes X discrete switching apparatus each having N ones of the W network interfaces, as well as a plurality of switching-expansion interconnects each interconnecting ones of the X switching apparatus, such that the W network interfaces are collectively interconnected in a non-blocking manner.

11 Claims, 4 Drawing Sheets

METHODS AND APPARATUS FOR INTERCONNECTION OF MEDIA GATEWAYS

BACKGROUND

Media gateways and other switching apparatus employed to switch TDM other types of data in a circuit-switched network are often designed for specific needs, particular known or projected traffic demands of one or more PSTN networks. However, it is not altogether uncommon that the traffic demands and/or other parameters employed to determine size, capability and performance of the switching apparatus can far exceed known and even projected traffic patterns.

Consequently, attempts have been made to design media gateways and other switching apparatus which are expandable, permitting reconfiguration as needed within a particular application or installation. However, such expandable apparatus are invariably blocking apparatus, thereby limiting the utility of some percentage of the apparatus' interfaces to the connected network(s). Moreover, the installation, maintenance and reconfiguration of these previous attempts at providing expandable switching apparatus have proven to be cost, time and labor intensive.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The following is at least a partial list of the acronyms that appear in the present disclosure. Those skilled in the art will readily recognize that the terms corresponding to each of the acronyms listed below may vary within the art, within the embodiments explicitly described herein, and within other embodiments within the scope of the present disclosure. Those skilled in the art will also understand that aspects of the present disclosure are not limited to applications pertaining specifically to any one or more of the following acronyms. Acronyms not listed below but otherwise mentioned or discussed herein should be recognized and understood by those skilled in the pertinent art within the context of the present disclosure. In the event that an acronym is employed in the present disclosure in a manner inconsistent with its usage in the art, the scope of the present disclosure is intended to include both the ordinary usage in the art and the specific usage herein.

| Acronym | Term |
| --- | --- |
| 2G | second generation wireless technology |
| 3G | third generation wireless technology |
| 3GPP | third generation partnership project |
| 3GPP2 | third generation partnership project 2 |
| AAL | ATM adaptation layer |
| AAL2 | AAL Type 2 |
| API | application interface, also possibly referred to as application program interface or application programming interface |
| AMR | adaptive multi-rate |
| ATM | asynchronous transfer mode |
| CALEA | Communications Assistance to Law Enforcement Act |
| CDMA | code-division-multiple-access |
| CDMA2000 | also known as IMT-CDMA Multi-Carrier or 1xRTT, is a code-division multiple access (CDMA) version of the IMT-2000 standard developed by the International Telecommunication Union (ITU) |
| CDR | call detail record |
| DSL | digital subscriber line |
| DSP | digital signal processor |
| GPRS | general packet radio service |
| HDLC | high-level data link control |
| IP | Internet Protocol |
| Iu | interface between the RNS and the core network |
| IuCS | circuit switched interface between 3G RNC and 3G MSC |
| IuPS | packet switched interface between 3G RNC and 3G SGSN |
| IuFP | Iu framing protocol |
| Iu UP | Iu interface user plane |
| MEGACO | media gateway control; control protocol between MG and MGC |
| MG | media gateway |
| MGC | media gateway controller |
| MSC | mobile switching center |
| MSM | multi-service module |
| Nb | interface between media gateways |
| NP-NI | non-packet network interface |
| NP-SM | non-packet switching matrix |
| PCM | pulse code modulation |
| PI | packet interface (e.g. packet network interface) |
| P-NI | packet network interface |
| POTS | plain old telephone service |
| P-SM | packet switching matrix |
| PSTN | public switched telephone network |
| QoS | quality of service |
| RAN | radio access network |
| RNC | radio network controller |
| RNS | radio network station |
| RR | receiver report |
| RTCP | realtime transport control protocol, or control protocol related to RTP |
| RTP | realtime transport protocol |
| SAP | service access point |
| SAR | segmentation and reassembly |
| SDR | session detail record |
| SR | sender report |
| SS7 | Signaling System 7 |
| TDM | time-division multiplexing |
| TFO | tandem free operation |
| TrFO | transcoder free operation |
| UMTS | universal-mobile-telecommunications-service |
| VoDSL | voice over DSL; e.g., voice delivered using DSL |
| VoIP | voice over IP; e.g., voice delivered using the Internet Protocol |
| VoP | voice over packet; e.g., voice delivered using packets |
| W-CDMA | Wideband Code-Division Multiple Access |

| Acronym | Term |
|---|---|
| WMG | media gateway which, in addition to wireless capabilities, may include wired or wireline switching, services, and/or other wired or wireline capabilities |

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 1:
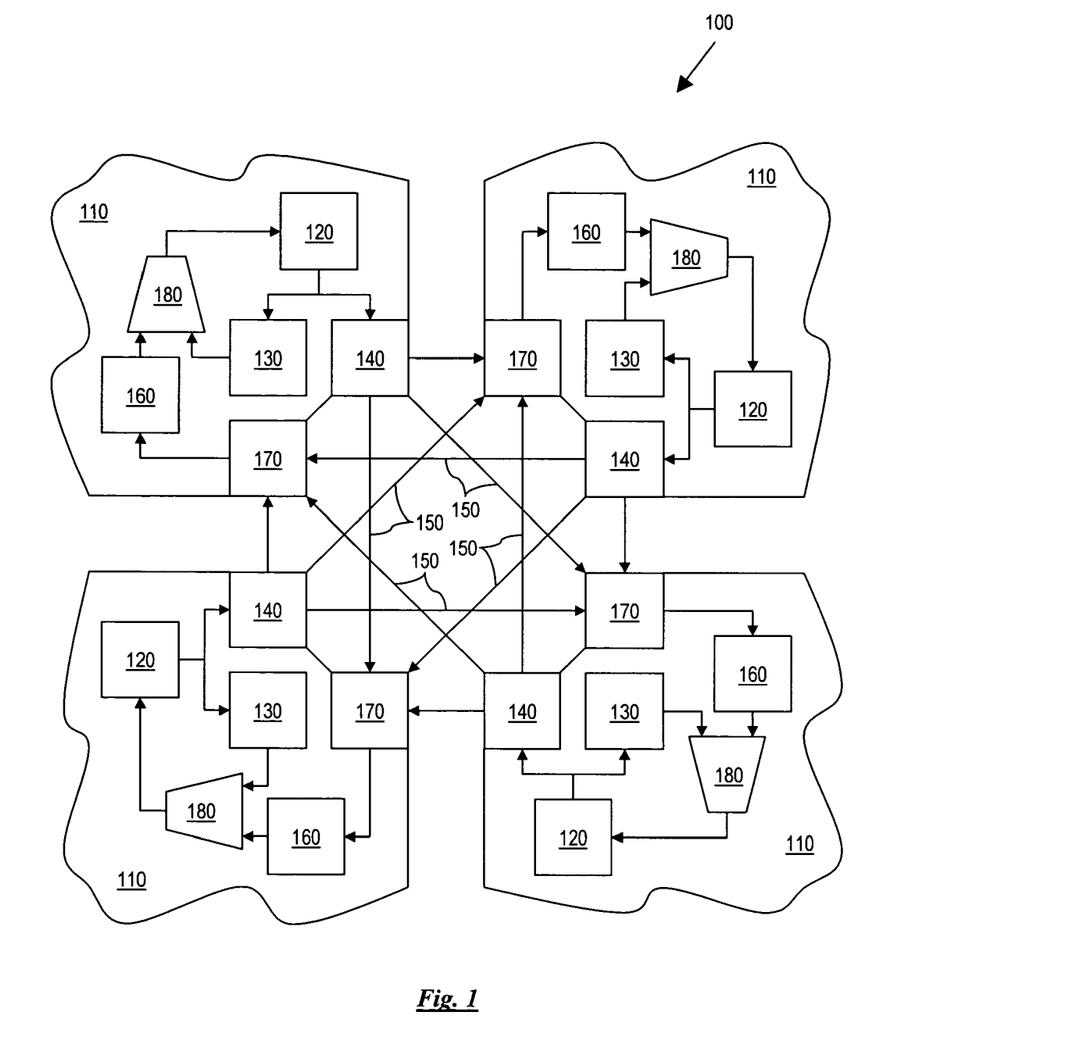
FIG. 1 is a schematic view of at least a portion of one embodiment of apparatus according to aspects of the present disclosure.

Referring to FIG. 1, illustrated is a schematic view of at least a portion of one embodiment of an apparatus 100 according to aspects of the present disclosure. The apparatus 100 may include, be, or be employed with a media gateway and/or a softswitch. Although not limited within the scope of the present disclosure, the media gateway may include, be, or be employed with one or more switches and/or other switching fabric components, IP gateways and/or other gateways, channel banks, and/or other devices. The media gateway may convert data from a format, protocol, and/or type required for one network to another format, protocol, and/or type required for another network, and/or otherwise convert data from a first type of data on a first transmission link to a second type of data on a second transmission link. The media gateway may terminate channels from a circuit-switched network and pass streaming media for a packet-switched network, such as RTP streams in an IP network. Input data for the media gateway may include audio, video, and/or T.120 (real-time multi-point communications), among others, which the media gateway may handle simultaneously or otherwise. In one embodiment, the media gateway may primarily or only serve a PSTN network, but may be reconfigurable to also serve other networks.

As employed herein, a network may refer to an entire network or to a network portion, a network application, and/or network apparatus. To that end, one or more instances of the apparatus 100 or components thereof, or other embodiments of the apparatus 100 within the scope of the present disclosure, may be singularly or collectively employed to bridge two or more networks, including those of PSTNs, among others. PSTN networks may employ TDM and/or PCM, among other non-packet formats and/or protocols.

The apparatus 100 includes a variable number X of switching apparatus 110, each of which may be a switching device or sub-system of a corresponding one of X media gateways. In the illustrated embodiment, the number X equals four (4). However, the number X may vary within the scope of the present application, such as according to aspects described below. In general, the apparatus 100 may be functional regardless of the value of the number X, including if the number X equals one (1), although benefits of certain aspects of the present disclosure may become more appreciable for embodiments in which the number X equals two (2) or more.

Each switching apparatus 110 includes a backplane 120 by which a number of PCM streams or other TDM or non-packet communications are delivered from a number of network interfaces to an independent switching matrix 130. Each independent switching matrix 130 may be an N×N time slot interchange (TSI) having N ingress ports and N egress ports, where the number N equals two (2) or more. However, aspects of the present disclosure may also be applicable to embodiments in which the independent switching matrix 130 has a different number of ingress and egress ports. For example, the number of ingress ports may be a multiple of the number of egress ports, such as where the number of ingress ports is two (2) times, three (3) times, or four (4) times the number of egress ports.

The number N may also vary within the scope of the present application, such as according to aspects described below. In general, the apparatus 100 may be functional regardless of the value of the number N, including if the number N equals two (2), although benefits of certain aspects of the present disclosure may become more appreciable for embodiments in which the number N equals two (2) or more. For example, the number N may be four (4), eight (8), sixteen (16), thirty-two (32), or sixty-four (64), among other values. In one embodiment, the number N may be equal to a higher power of two (2), such as 128 or 256. The number N may also be equal to a number of DS0s, transmissions links or network interfaces corresponding to or integral to each switching apparatus 110, and/or may be equal to the maximum number of PCM streams deliverable from the backplane 120 to the independent switching matrix 130, including in non-blocking configurations.

The discussion that follows may refer to the number X as the number of switching apparatus 110 in the apparatus 100, and may refer to the number N as the number of DS0s of one of the switching apparatus 110, unless otherwise indicated. However, this convention is employed merely for the sake of simplicity, clarity and ease of description, and should in no way be considered a limitation to the scope of the present disclosure.

Each switching apparatus 110 also includes a distributor 140, which may sometimes be referred to as a "fan-out." Within each switching apparatus 110, the PCM streams delivered to the independent switching matrix 130 from the backplane 120 are also delivered to the distributor 140. The distributor 140 is configured to copy each of the PCM streams received at a switching apparatus 110 to one or more of the other switching apparatus 110. For example, as in the embodiment depicted in FIG. 1, the distributor 140 transmits each of the PCM streams to each of the other X−1 switching apparatus 110 via a completely meshed arrangement of switching-expansion interconnects 150. However, embodiments other than complete meshing are also within the scope of the present disclosure, such that one or more of the X switching apparatus 110 may not be connected to one or more of the other X−1 switching apparatus 110. For example, each of the X switching apparatus 110 may only be connected to the one or two nearest ones of the other X−1 switching apparatus 110 (e.g., nearest spatially).

One or more of the switching-expansion interconnects 150 may each be an intergateway trunk, such as a bundle of optical fibers, copper wires and/or other digital communication mediums. One or more of the switching-expansion interconnects 150 may also be or comprise one or more interconnects, traces, or other electrical conductors located on or integral to a circuit board connected to or otherwise associated with the backplane 120, such as where two or more of the switching apparatus 110 may be interconnected by their connection to the backplane resulting from their installation into a common chassis. One or more of the switching-expansion interconnects 150 may also be a jumper or patch cord or other relatively short-length wire or fiber, possibly having modular or standard connectors for coupling to the backplane 120 and/or directly to the switching apparatus 110.

Each switching apparatus 110 also includes an expansion switching matrix 160 and a collector 170, which may sometimes be referred to as a "fan-in." Each expansion switching matrix 160 may be or include a TSI, and may thus be referred to as an expansion TSI.

Within each switching apparatus 110, the PCM streams distributed by each of the other X−1 switching apparatus 110 (if completely meshed) are received by the collector 170 and forwarded to the expansion switching matrix 160. Each expansion switching matrix 160 may be an M×N TSI having M ingress ports and N egress ports, where the number M equals the product of X−1 and N (e.g., in a completely meshed arrangement of all of the switching apparatus 110). However, aspects of the present disclosure may also be applicable to embodiments in which the expansion switching matrix 160 has a different number of ingress ports and/or a different number of egress ports. For example, the number M of ingress ports may be any multiple of the number of egress ports, or may equal the product of X−P and N, where the number P is some integer or fractional number other than the number one (1).

Each switching apparatus 110 also includes a mux 180, which may sometimes be referred to as a multiplexer. Within each switching apparatus 110, the mux 180 is configured to perform a per-time-slot multiplexing of the PCM streams received from the independent switching matrix 130 and the expansion switching matrix 160. The multiplexed stream from the mux 180 is returned to the backplane 120, such as for delivery to the one or more PSTN or other networks connected to the apparatus 110.

Aspects of many embodiments within the scope of the present disclosure, such as the embodiment shown in FIG. 1, may provide an expandable switching apparatus 100 demonstrating a technique for coupling multiple media gateways or other switching apparatus in a non-blocking, uncomplicated, affordable, and/or reliable manner. Those skilled in the art will understand that the term "non-blocking" may refer to a switching apparatus having N network interfaces (DS0s) and capable of N/2 connections. Non-blocking can also indicate that any communication arriving at one of the N network interfaces can be connected to any other of the N network interfaces regardless of the number of other N network interfaces currently involved in a communications session. However, other aspects of the term "non-blocking" may also be applicable within the context of the present disclosure. Nonetheless, aspects of some embodiments of the present disclosure may permit the expansion of a media gateway or other switching component of a network, such as may be necessary in response to an increased demand on the network.

For example, one such network may include the apparatus 100 of FIG. 1 as a media gateway (or a media gateway portion). However, over time, the demand on the network may exceed the bandwidth and/or other performance metrics of the apparatus 100. Consequently, an additional switching apparatus 110 may be added to the apparatus 100. The additional switching apparatus 110 may be connected to each of other switching apparatus 110 if a completely meshed arrangement is employed. In this manner, a number N of additional network interfaces (DS0s) may be added to the apparatus 100, and these additional network interfaces can be implemented while maintaining a non-blocking configuration.

Figure 2:
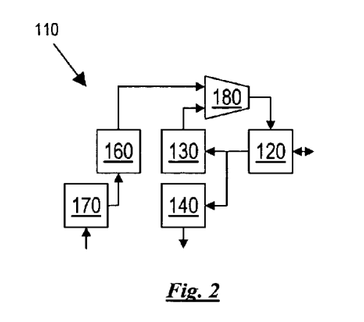
FIG. 2 is a schematic view of at least a portion of another embodiment of apparatus according to aspects of the present disclosure.

Referring to FIG. 2, illustrated is a schematic view of at least a portion of one of the switching apparatus 110 shown in FIG. 1. As in FIG. 1, the switching apparatus 110 shown in FIG. 2 includes a backplane 120 from which a number N of PCM streams are delivered to an independent switching matrix 130 and a distributor 140. The distributor 140 is configured to fan-out the N PCM streams to each of X−1 switching apparatus 110 (shown in FIG. 1), and the apparatus 110 also includes a collector 170 configured to receive N PCM streams from each of the other X−1 switching apparatus 110, which and then switched by an expansion switching matrix 160 to a mux 180 for delivery back to the backplane 120.

As described above, the performance and/or capability of the apparatus 100 of FIG. 1 may be increased by interconnecting one or more additional instances of the switching apparatus 110. However, the performance and/or capability of the apparatus 100 of FIG. 1 may alternatively or additionally be increased by altering one of more of the existing instances of the switching apparatus 110. That is, switching apparatus other than the switching apparatus 110 may be added to increase performance and/or capability of an existing, operating instance of the apparatus 100 or the apparatus 110, such that a first number of data streams may be switched prior to the expansion, and a greater number of data streams may be switched after the expansion. As described below, the additional switching apparatus which may be employed to expand performance and/or capability of an existing switching apparatus may merely comprise adding, for example, an additional TSI. Nonetheless, whether the performance and/or capability expansion involves additional instances of the apparatus 110 and/or additional instances of a TSI or other switching apparatus, the expanded number of switching apparatus and/or network interfaces after the expansion can include the switching apparatus and/or network interfaces that were operational prior to the expansion.

Moreover, this configurable nature of some embodiments within the scope of the present disclosure may similarly be utilized to decrease performance and/or capability, such as by decreasing the number of switching apparatus 110 that are interconnected within the apparatus 100, or by decreasing the number of TSIs within one or more switching apparatus 110. The configurable aspects of the apparatus 100 and 110 of FIGS. 1 and 2 are also not necessarily limited to those described below.

Figure 3:
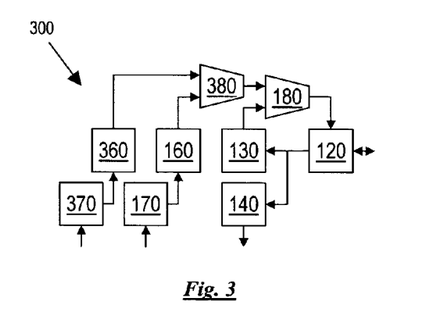
FIG. 3 is a schematic view of at least a portion of another embodiment of apparatus according to aspects of the present disclosure.

Referring to FIG. 3, illustrated is a schematic view of at least a portion of another embodiment of the switching apparatus 110 shown in FIG. 2, herein designated by the reference numeral 300. The switching apparatus 300 is substantially similar to the switching apparatus 110 shown in FIG. 2. However, the switching apparatus 300 includes an additional collector 370 for receiving additional PCM streams from, for example, an additional number N of network interfaces (DS0s). The additional PCM streams received by the additional collector 370 are delivered to an additional expansion switching matrix 360. The switching apparatus 300 also includes an additional mux 380 configured to multiplex the PCM streams switched by the expansion switching matrices 160 and 360. The mux 180 may then multiplex the output of the mux 380 with the data switched by the independent switching matrix 130, which may then be delivered to the backplane 120 for delivery to the PSTN or other network connected to the switching apparatus 300 (or connected to the apparatus comprising the switching apparatus 300).

Figure 4:
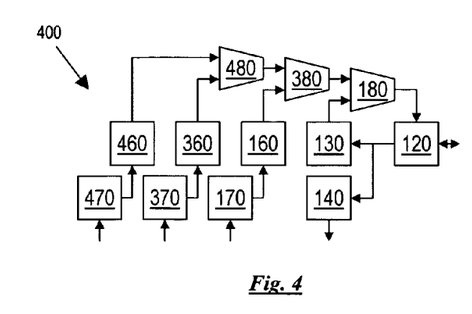
FIG. 4 is a schematic view of at least a portion of another embodiment of apparatus according to aspects of the present disclosure.

Referring to FIG. 4, illustrated is a schematic view of at least a portion of another embodiment of the switching apparatus 300 shown in FIG. 3, herein designated by the reference numeral 400. The switching apparatus 400 is substantially similar to the switching apparatus 300 shown in FIG. 3. However, the switching apparatus 400 includes an additional collector 470 for receiving additional PCM streams from, for example, an additional number N of network interfaces (DS0s). The additional PCM streams received by the additional collector 470 are delivered to an additional expansion switching matrix 460. The switching apparatus 400 also includes an additional mux 480 configured to multiplex the PCM streams switched by the expansion switching matrices 360 and 460. The mux 380 may then multiplex the output of the mux 480 with the data switched by the expansion switching matrix 160. The mux 180 may then multiplex the output of the mux 380 with the data switched by the independent switching matrix 130, which may then be delivered to the backplane 120 for delivery to the PSTN or other network connected to the switching apparatus 400 (or connected to the apparatus comprising the switching apparatus 400).

Figure 5:
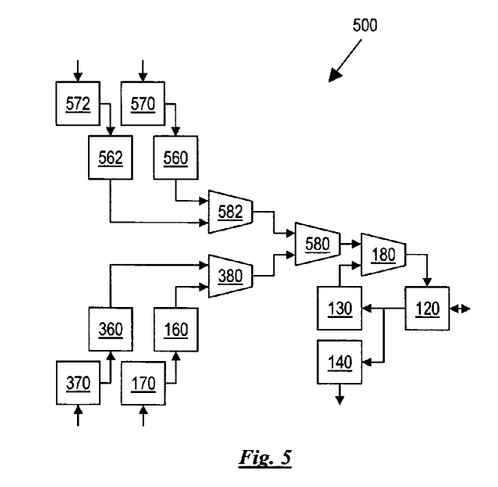
FIG. 5 is a schematic view of at least a portion of another embodiment of apparatus according to aspects of the present disclosure.

Referring to FIG. 5, illustrated is a schematic view of at least a portion of another embodiment of the switching apparatus 300 shown in FIG. 3, herein designated by the reference numeral 500. The switching apparatus 500 is substantially similar to the switching apparatus 300 shown in FIG. 3. However, the switching apparatus 500 includes additional collectors 570 and 572 each configured to receive additional PCM streams from, for example, an additional number N of network interfaces (DS0s). The additional PCM streams received by the additional collectors 570 and 572 are switched by additional expansion switching matrices 560 and 562 for delivery to an additional mux 582, where the additional PCM streams are multiplexed and delivered to an additional mux 580. The mux 580 is configured to multiplex the multiplexed output of the mux 582 and the multiplexed output of the mux 380, which is then multiplexed with the data switched by the independent switching matrix 130. As with the embodiments described above, the multiplexed data from the final mux 180 may be delivered to the backplane 120 for delivery to the PSTN or other network connected to the switching apparatus 500 (or connected to the apparatus comprising the switching apparatus 500).

Figure 6:
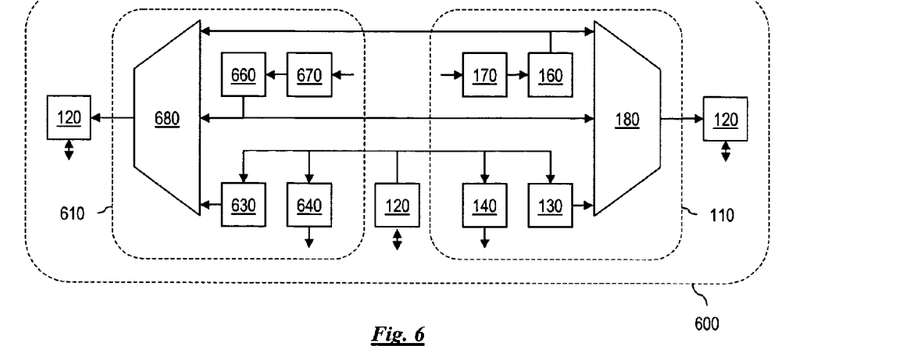
FIG. 6 is a schematic view of at least a portion of another embodiment of apparatus according to aspects of the present disclosure.

Referring to FIG. 6, illustrated is a schematic view of at least a portion of another embodiment of the switching apparatus 110 shown in FIGS. 1 and 2, herein designated by the reference numeral 600. The switching apparatus 600 is substantially similar to the switching apparatus 110 shown in FIGS. 1 and 2. However, the switching apparatus 600 incorporates self-redundancy aspects of the present disclosure that aren't explicitly depicted in the switching apparatus 110 shown in FIGS. 1 and 2.

The apparatus 600 includes a working switching apparatus 110 and a protecting switching apparatus 610, each of which being configured to receive identical copies (which may be substantially synchronized) from a backplane 120. The backplane 120 is substantially similar to the backplane 120 described above with reference to FIGS. 1 and 2. Each of the working switching apparatus 110 and the protecting switching apparatus 610 may be substantially similar to the switching apparatus 110 shown in FIGS. 1 and 2.

For example, the working switching apparatus 110 includes an independent switching matrix 130 and a distributor 140 each configured to receive identical copies (which may be substantially synchronized) of a number N of PCM streams from the backplane 120. The distributor 140 is configured to fan-out the PCM streams to each of X−1 working switching apparatus 110 of other instances of the apparatus 600. A collector 170 is configured to receive N PCM streams from each of such other X−1 working switching apparatus 110. An expansion switching matrix 160 switches the N PCM streams from each of the other X−1 working switching apparatus 110 onto a mux 180 for multiplexing and delivery back to the backplane 120.

Similarly, the protecting switching apparatus 610 includes an independent switching matrix 630 and a distributor 640 each configured to receive a number N of PCM streams from the backplane 120. The PCM streams received by the independent switching matrix 630 and the distributor 640 may be identical copies of (and possibly substantially synchronized with) the PCM streams received by the independent switching matrix 130 and the distributor 140. The distributor 640 is configured to fan-out the PCM streams to each of X−1 protecting switching apparatus 610 of other instances of the apparatus 600, and a collector 670 is configured to receive N PCM streams from each of such other X−1 protecting switching apparatus 610. An expansion switching matrix 660 switches the N PCM streams from each of the other X−1 protecting switching apparatus 610 onto a mux 680 for multiplexing and delivery back to the backplane 120. The multiplexed streams delivered to the backplane from the mux 680 may be identical copies of (and possibly substantially synchronized with) the multiplexed streams delivered to the backplane from the mux 180.

Moreover, as in the embodiment illustrated in FIG. 6, each of the muxes 180 and 680 may have a third input. That is, the switched data from the expansion switching matrix 160 may be sent to the mux 680 in addition to being sent to the mux 180. The data sent to the mux 680 from the expansion switching matrix 160 may be an identical copy of (and possibly be substantially synchronized with) the data sent to the mux 180 from the expansion switching matrix 160. Similarly, the switched data from the expansion switching matrix 660 may be sent to the mux 180 in addition to being sent to the mux 680. The data sent to the mux 180 from the expansion switching matrix 660 may be an identical copy of (and possibly be substantially synchronized with) the data sent to the mux 680 from the expansion switching matrix 660.

The apparatus 600 may also include one or more additional muxes or other selectors not illustrated in FIG. 6. For example, a selector may be included between the backplane 120 and one or more of the distributors 140 and 640. In one such embodiment, the selector is configured to receive N first and second PCM streams from N network interface DS0s via first and second interfaces to the backplane 120, respectively, where the first interface to the backplane 120 is associated with the working switching apparatus 110 and the second interface to the backplane 120 is associated with the protecting switching apparatus 610. The N first and second PCM streams may be identical copies of (and possibly substantially synchronized) the PCM streams coming into the apparatus 600 by N DS0 network interfaces. Consequently, the selector is configured to select one of the PCM streams for delivery to the distributor 140 or 640, such as on a time-slot basis or otherwise.

According to the above-described aspects, embodiments of the apparatus 600 within the scope of the present disclosure can be a self-redundant switching apparatus. That is, self-redundant embodiments of the apparatus 600 may be those in which multiple instances of one or more components of the apparatus 600 are employed. For example, two or more of the above-described components may be paired in a primary-backup configuration, including the independent switching matrices 130 and 630, the distributors 140 and 640, the expansion matrices 160 and 660, the collectors 170 and 670 and/or the muxes 180 and 680. In one embodiment in which one or more such pairs of components are employed in a self-redundant arrangement, any data received via network interface or switching expansion interconnect may be sent to and/or similarly processed by both the primary and backup component. Consequently, in the event that either the primary or backup component lags or otherwise malfunctions, the next component scheduled to receive the data may still receive the data in a timely manner with little or no impact to QoS or other processing metrics.

Figure 7:
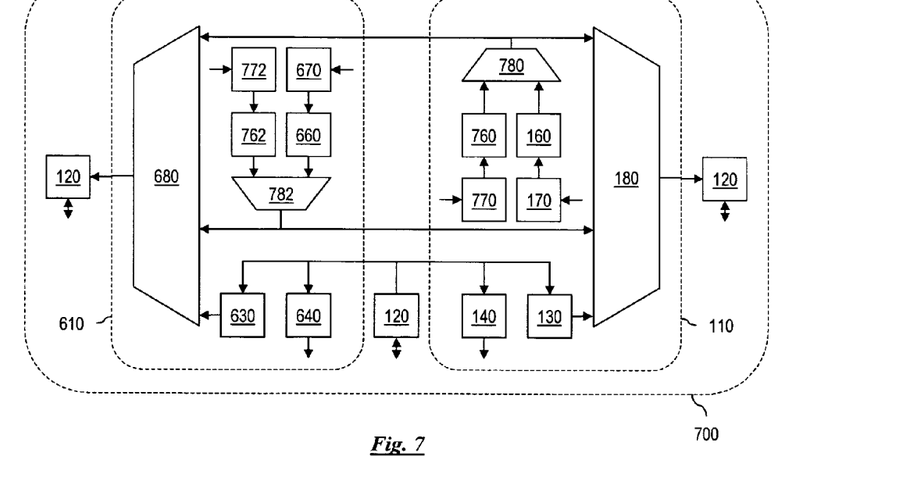
FIG. 7 is a schematic view of at least a portion of another embodiment of apparatus according to aspects of the present disclosure.

The expansions capabilities and other aspects of the embodiments shown in FIGS. 1-5 are also applicable or readily adaptable to the apparatus 600 shown in FIG. 6. For example, referring to FIG. 7, illustrated is another embodiment of the apparatus 600 shown in FIG. 6, herein designated by the reference number 700. The apparatus 700 is substantially similar to the apparatus 600 shown in FIG. 6. However, the apparatus 700 also includes additional collectors 770 and 772 for receiving additional PCM streams from, for example, an additional number N of network interfaces (DS0s). The additional PCM streams received by the additional collectors 770 and 772 are delivered to additional expansion switching matrices 760 and 762. The apparatus 700 also includes an additional mux 780 configured to multiplex the PCM streams switched by the expansion switching matrices 160 and 760, and an additional mux 782 configured to multiplex the PCM streams switched by the expansion switching matrices 660 and 762. The mux 180 may then multiplex the output of the muxes 780 and 782 with the data switched by the independent switching matrix 130, which may then be delivered to the backplane 120, and the mux 680 may multiplex the output of the muxes 780 and 782 with the data switched by the independent switching matrix 630, which may also be delivered to the backplane 120.

Figure 8:
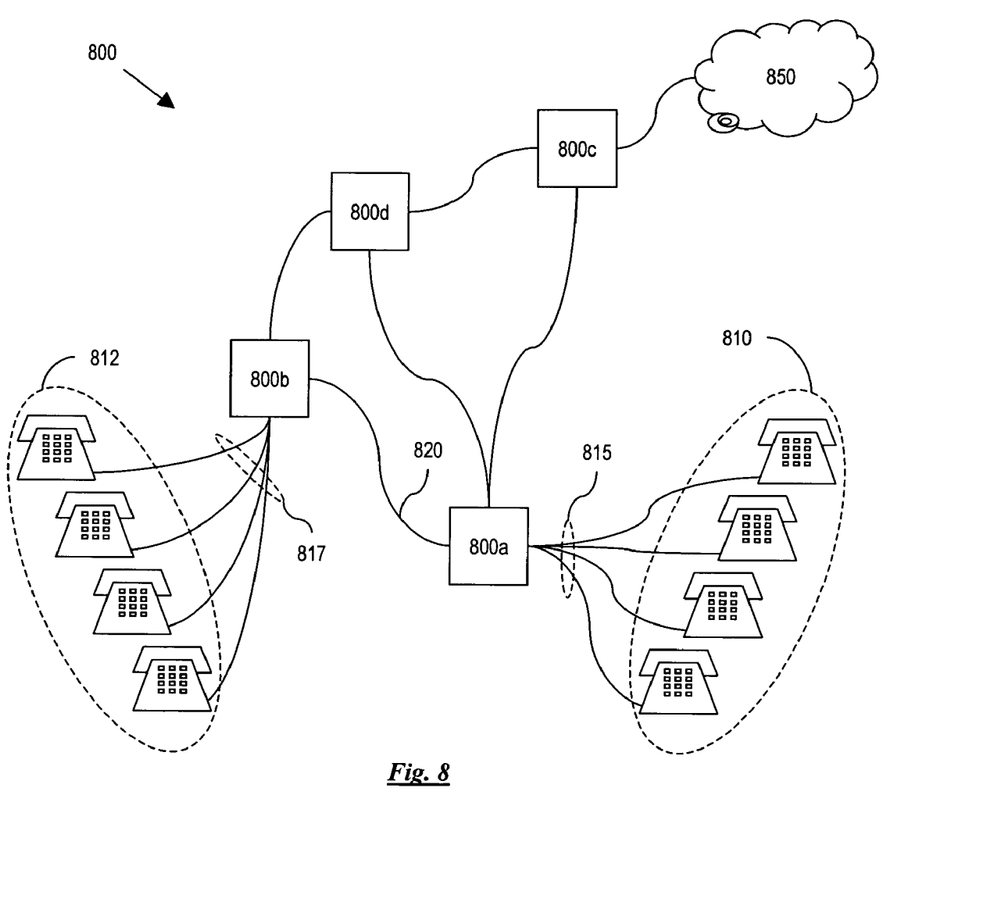
FIG. 8 is a schematic view of at least a portion of embodiments of a network and network apparatus according to aspects of the present disclosure.

Referring to FIG. 8, illustrated is a schematic diagram of at least a portion of one embodiment of a network 800 according to aspects of the present disclosure. The network 800, which may include several networks and/or portions of networks, is one environment in which the apparatus 100 of FIG. 1, the apparatus 300 of FIG. 3, the apparatus 400 of FIG. 4, the apparatus 500 of FIG. 5, the apparatus 600 of FIG. 6, and/or the apparatus 700 of FIG. 7 may be implemented according to aspects of the present disclosure. For example, the network 800 includes apparatus 800a-d, where aspects of each of the apparatus 800a-d may be substantially similar to aspects of the apparatus 100, 110, 300, 400, 500, 600, 610 and/or 700 described above.

The apparatus 800a is connected by a plurality of loops 815 to one or more PSTN access networks 810 that may include a plurality of residential telephones and/or business exchanges (PBX). In one embodiment, the telephones may be grouped by digital loop carriers and/or other aggregators which, possibly in addition to one or more PBX, may be included in one or more of the PSTN access networks 810, or may otherwise be configured to communicate with the apparatus 800a through a PSTN network 810. The loops 815 may include digital loops and/or analog loops, and may be configured to transmit TDM and other PSTN data, among others. Thus, the apparatus 800a may be, or may be employed as, a central office switch, or a Class 5 switch. Accordingly, any PSTN access network 810 connected to the apparatus 800a may communicate with another PSTN access network 810 connected to the apparatus 800a.

The apparatus 800a is also connected to the apparatus 800b by a trunk or other transmission line 820. The apparatus 800b is, in turn, connected to a plurality of residential telephones, business PBXs, digital loop carriers, and/or PSTN access networks 812 (hereafter collectively referred to as PSTN access networks 812, although merely for the sake of simplicity) by a corresponding plurality of loops 817, which may each be substantially similar to one or more of the loops 815. Thus, any of the PSTN access networks 810 may communicate with any of the PSTN access networks 812 via the apparatus 800a and 800b, the trunk 820, and corresponding ones of the loops 815, 817.

The apparatus 800c and/or 800d may be deployed as a media gateway to interconnect a PSTN or other type of network 850. The apparatus 800c and/or 800d may also or alternatively be deployed as a tandem media gateway or Class 4 switch to interconnect a local access PSTN network (e.g., networks 810) to tandem network 850 (e.g., via apparatus 800a).

In view of all of the above, it should be understood that the present disclosure introduces an apparatus that includes W interfaces to a circuit-switched network, where W is an integer number that equals the product of smaller integer numbers X and N. The apparatus also includes X discrete switching apparatus each having N of the W network interfaces, as well as a plurality of switching-expansion interconnects each interconnecting ones of the X switching apparatus such that the W network interfaces are collectively interconnected in a non-blocking manner.

Another embodiment of such an apparatus includes a plurality of switching apparatus and a plurality of circuit-switched network interfaces. Each of the plurality of network interfaces is associated with one of the plurality of switching apparatus, and each of the plurality of switching apparatus is configured to receive a first plurality of PCM streams from the associated one of the plurality of switching apparatus. Each of the plurality of switching apparatus is further configured to receive a second plurality of PCM streams from at least one other of the plurality of switching apparatus via at least one of a plurality of switching-expansion interconnects. The plurality of network interfaces are collectively interconnected by the plurality of switching apparatus and the plurality of switching-expansion interconnects in a non-blocking manner.

The present disclosure also introduces a method that, in one embodiment, includes receiving a first plurality of PCM streams at a plurality of network interfaces associated with a first switching apparatus. The method also includes switching the first plurality of PCM streams via a first TSI to a first plurality of switched streams. A second plurality of PCM streams is received at a collector of the first switching apparatus. The second plurality of PCM streams originates from a second switching apparatus coupled to first switching apparatus. The second plurality of PCM streams is switched via a second TSI to a second plurality of switched streams. The first and second pluralities of switched streams are multiplexed, and ones of the multiplexed first and second pluralities of switched streams are directed towards ones of the plurality of network interfaces.

The foregoing has outlined features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An apparatus, comprising:
a configurable number N of media gateways, N being an integer of at least three, each of which processes media data from both a circuit-switched network and a packet-switched network;
a configurable number of discrete switching apparatus, each of which comprises a switching device or switching subsystem of one of the media gateways, each switching apparatus having a plurality of circuit-switched network interfaces, wherein at least two of the media gateways are paired in a primary-backup redundant configuration; and
each of the media gateways including a plurality of switching-expansion interconnects that comprise inter-gateway trunks for interconnecting the media gateways by interconnecting the discrete switching apparatus to collectively form a non-blocking switching apparatus, wherein the switching expansion interconnects connect the N media gateways to each other in a full mesh configuration such that circuit switched media data can travel directly between each of the N media gateways without passing through an intermediate media gateway, and wherein each of the media gateways is configured to receive:
  a plurality of first media data streams from its plurality of circuit-switched network interfaces; and
  a plurality of second media data streams from at least one other one of the configurable number of discrete switching apparatus via at least one of the plurality of switching-expansion interconnects; and
wherein each of the media gateways includes:
  an independent time-slot-interchanger (TSI) configured to switch the plurality of first media data streams received from its plurality of circuit-switched network interfaces;
  an expansion TSI configured to switch the plurality of second media data streams received from at least one other one of the configurable number of media gateways; and
  a multiplexer configured to multiplex the plurality of first media data streams switched by the independent TSI with the plurality of second media data streams switched by the expansion TSI.

2. The apparatus of claim 1 wherein the pluralities of first and second media data streams are pluralities of first and second pulse-code-modulated (PCM) data streams.

3. A method, comprising:
providing a configurable number N of media gateways, each of which processes media data from both a circuit-switched network and a packet-switched network, N being an integer of at least three, each of the media gateways having a discrete switching apparatus comprising a switching device or switching subsystem of its respective media gateway;
wherein providing a configurable number of media gateways includes providing a first number of media gateways, each media gateway having at least one network interface for sending and receiving circuit-switched media data;
interconnecting the N media gateways via a plurality of switching expansion interconnects that comprise inter-gateway trunks that interconnect the media gateways in a full mesh configuration by interconnecting their respective discrete switching apparatus;
switching a plurality of first media data streams between ones of the circuit-switched network interfaces via the first number of the N media gateways;
changing the first number of media gateways to a second number of the N media gateways, each having at least one network interface for receiving circuit-switched media data; and
switching a plurality of second media data streams between ones of a plurality of second circuit-switched network interfaces via the second number of media gateways;
wherein at least one of the first number of media gateways and the second number of media gateways is collectively interconnected in a non-blocking arrangement, such that circuit-switched media data can travel directly between each of the media gateways without passing through an intermediate media gateway, wherein at least two of media gateways are paired in a primary-backup redundant configuration, and wherein each of the media gateways includes:
  an independent time-slot-interchanger (TSI) configured to switch the plurality of first media data streams received from its circuit-switched network interfaces;
  an expansion TSI configured to switch the plurality of second media data streams received from at least one other one of the configurable number of media gateways; and
  a multiplexer configured to multiplex the plurality of first media data streams switched by the independent TSI with the plurality of second media data streams switched by the expansion TSI.

4. The method of claim 3 wherein at least one of the first number of media gateways includes at least one first time slot interchanger (TSI), and wherein changing the number of discrete switching apparatus includes adding at least one second TSI to the at least one of the number of discrete switching apparatus, wherein the at least one first TSI includes the independent TSI and the at least one second TSI includes the expansion TSI.

5. The method of claim 3 wherein the first number of media gateways is a first plurality of media gateways collectively interconnected in first non-blocking arrangement, and wherein the second number of media gateways is a second plurality of media gateways collectively interconnected in a second non-blocking arrangement.

6. The method of claim 3 wherein the second plurality of circuit-switched network interfaces includes each of the first plurality of circuit-switched network interfaces.

7. The method of claim 3 wherein the configurable number of media gateways includes each of the first number of media gateways and each of the second number of media gateways.

8. The method of claim 3 wherein the pluralities of first and second media data streams are pluralities of first and second pulse-code-modulated (PCM) data streams.

9. A method, comprising:
providing a configurable number N of media gateways, each of which processes media data from both a circuit-switched network and a packet-switched network, N being an integer of at least three;
interconnecting each of the N media gateways via a plurality of switching expansion interconnects that comprise inter-gateway trunks that interconnect the media gateways in a full mesh configuration by interconnecting respective discrete switching apparatus comprising switching devices or switching subsystems of the media gateways;
receiving a plurality of circuit-switched network media data streams via a plurality of circuit-switched network interfaces each associated with a first media gateway of the N media gateways;

distributing each of the plurality of circuit-switched network media data streams to a second media gateway of the N media gateways, the second media gateway having at least one network interface wherein at least two of the media gateways are paired in a primary-backup redundant configuration;

receiving a plurality of switching-expansion media data streams at the first media gateway, the plurality of switching-expansion media data streams each originating from the second media gateway;

multiplexing portions of the plurality of circuit-switched network media data streams and portions of the plurality of switching-expansion media data streams into a plurality of multiplexed media data streams; and transmitting ones of the plurality of multiplexed media data streams via ones of the plurality of circuit-switched network interfaces, and wherein each of the first media gateway and the second media gateways includes:

an independent time-slot-interchanger (TSI) configured to switch the plurality of circuit-switched network media data streams received from its circuit-switched network interfaces;

an expansion TSI configured to switch the plurality of switching-expansion media data streams received from at least one other one of the configurable number of media gateways; and a multiplexer configured to conduct the multiplexing of the portions of the plurality of circuit-switched network media data streams switched by the independent TSI and the portions of the plurality of switching-expansion media data streams switched by the expansion TSI.

10. The method of claim 9 further comprising switching each of the plurality of circuit-switched network media data streams via a first time slot interchanger (TSI) of the first media gateway and switching each of the plurality of switching-expansion media data streams via a second TSI of the first media gateway prior to the multiplexing.

11. The method of claim 9 wherein the plurality of circuit-switched network media data streams is a plurality of circuit-switched network pulse-code-modulated (PCM) data streams and the plurality of switching-expansion media data streams is a plurality of switching-expansion PCM data streams.

* * * * *